United States Patent [19]

Winkam et al.

[11] Patent Number: 4,811,628
[45] Date of Patent: Mar. 14, 1989

[54] LOCKABLE DIFFERENTIAL GEAR

[75] Inventors: Gamjad Winkam, Zolling; Manfred Lommerzheim, Neufahrn, both of Fed. Rep. of Germany

[73] Assignee: Bayerische Motoren Werke Aktiengesellschaft, Munich, Fed. Rep. of Germany

[21] Appl. No.: 111,633

[22] Filed: Oct. 23, 1987

[30] Foreign Application Priority Data

Oct. 24, 1986 [DE]  Fed. Rep. of Germany ....... 3636175

[51] Int. Cl.⁴ ..................... F16H 1/44; F16D 25/08
[52] U.S. Cl. ..................... 74/710.5; 192/85 CA
[58] Field of Search .................. 74/710.5, 710, 711; 192/85 CA

[56] References Cited

U.S. PATENT DOCUMENTS

| | | | |
|---|---|---|---|
| 3,460,404 | 8/1969 | Schmid | 74/710.5 |
| 3,894,446 | 7/1975 | Snoy et al. | 74/710.5 |
| 3,915,267 | 10/1975 | Shea | 74/710.5 |
| 3,974,717 | 8/1976 | Breed et al. | 74/710.5 |
| 4,627,513 | 12/1986 | Tutzer | 74/710.5 |
| 4,644,823 | 2/1987 | Mueller | 74/710.5 |
| 4,679,463 | 7/1987 | Ozaki et al. | 74/710.5 |
| 4,730,514 | 3/1988 | Shikata et al. | 74/711 |

FOREIGN PATENT DOCUMENTS

| | | |
|---|---|---|
| 0063432 | 10/1982 | European Pat. Off. . |
| 0185247 | 6/1986 | European Pat. Off. . |
| 1934340 | 1/1971 | Fed. Rep. of Germany . |
| 3313283 | 10/1984 | Fed. Rep. of Germany . |
| 3444843 | 6/1986 | Fed. Rep. of Germany . |
| 2434969 | 3/1980 | France . |
| 1290542 | 9/1972 | United Kingdom . |

Primary Examiner—Allan D. Herrmann
Attorney, Agent, or Firm—Barnes & Thornburg

[57] ABSTRACT

A lockable differential gear for motor vehicles in which the locking mechanism includes a lamellae set adapted to be actuated from the outside by an annular piston. The differential gear of the invention is so constructed that the forces are not guided by way of the radial bearing between the differential housing and the transmission housing when the locking mechanism is actuated. This is achieved by additional axial bearings. The force flow is thereby introduced in one embodiment by way of a separate transmission member. In other embodiments, the force flow proceeds by way of a wheel output shaft and finally in still another embodiment, the force flow is transmitted inside of the differential housing.

9 Claims, 4 Drawing Sheets

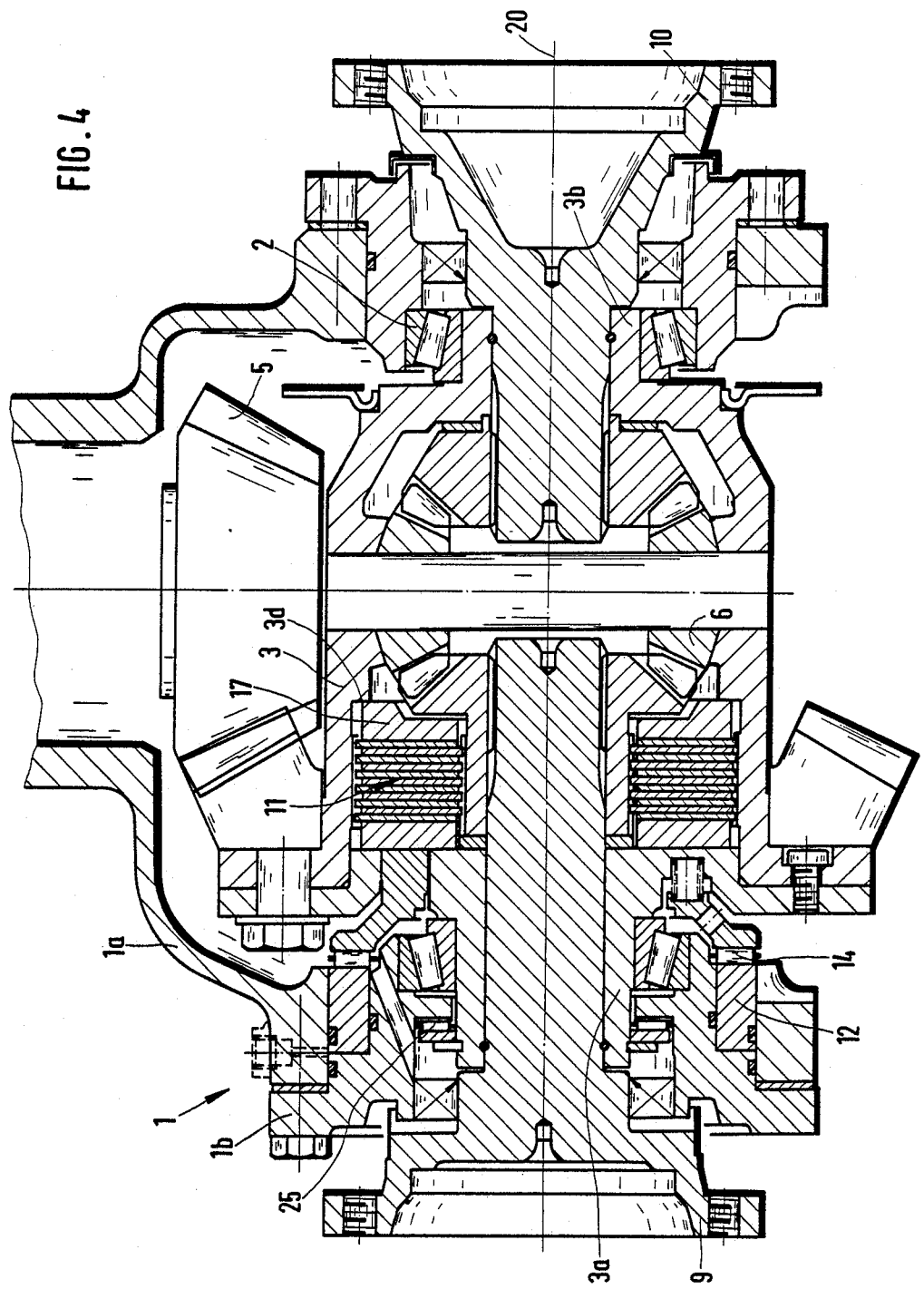

LOCKABLE DIFFERENTIAL GEAR

BACKGROUND AND SUMMARY OF THE INVENTION

The present invention relates to lockable differential gears for motor vehicles with a transmission or gear housing and a differential housing rotatably supported therein as well as with a lamellae set arranged in the differential housing which is adapted to be acted upon from the outside with a locking force.

Such a differential gear is disclosed in the DE-OS No. 33 13 283. In one construction of this prior art publication, a hydraulic piston displaceably arranged in the gear housing is rotatably supported by way of a radial bearing on a wheel output shaft. The axle shaft gear is seated at the other end of the wheel output shaft protruding into the differential housing, secured by way of a thrust ring. The lamellae set representing the differential locking means is provided, in turn, between the axle shaft gear and the differential housing. Upon actuation of the locking mechanism, the piston seeks to pull the output shaft toward the outside which thereby takes along the axle shaft gear by way of the thrust ring. The axle shaft gear presses the lamellae set against a support wall of the differential housing and effects a friction-locking connection between the differential housing and the wheel output shaft.

A disadvantage of this prior art solution resides in that the force path during actuation of the differential locking mechanism leads by way of the radial bearing arranged between the hydraulic piston and the wheel output shaft. The radial bearing must be dimensioned correspondingly large in order to withstand the loads. However, this is not always desirable not only for cost reasons, but also for space reasons. A further and much greater disadvantage exists with this prior art construction in that as a result of the transmitted torque the tooth pressure which exists between the differential bevel gear and the axle shaft gear, seeks to displace the axle shaft gear in the direction toward the lamellae set and therewith to lock the differential gear up to a certain degree. In other words, during normal driving operation, the prior art differential locking mechanism always exhibits a certain and undesired locking action.

In a further embodiment of the aforementioned prior art publication, a lamellae carrier is provided between the lamellae set and the wheel output shaft, which is non-rotatably seated on this shaft by way of a spline-tooth arrangement, but is axially displaceable on the shaft. The axle shaft gear is held on the lamellae carrier by way of a further spline-tooth arrangement which axle shaft gear is again supported at the differential housing. It is achieved in this manner that the previously described disadvantage of a continuing locking of the differential gear as a result of the tooth pressure does not occur. However, this solution entails a different disadvantage. The moment introduced by way of the drive pinion and the differential bevel gears is conducted from the axle shaft gear by way of the lamellae carrier to the output shaft and the individual teeth of the spline-tooth arrangement are pressed against one another. If the differential locking mechanism is engaged in this operating condition and if the locking action is again to be cancelled, the lamellae carrier can no longer be axially moved owing to this jamming action in the spline-tooth arrangement. The gear remains locked until the driving torque is taken back.

In a further embodiment, the lamellae set is again supported at the axle shaft gear whereby the latter further conducts the abutment force of the lamellae into the differential housing by way of the teeth of the differential bevel gears. The disadvantage of this solution resides in that during the locking the differential housing together with its spur bevel gear is axially displaced slightly by reason of the force path. However, the spur bevel gear meshes with the drive pinion with a very accurately adjusted tooth play. During the locking operation, this tooth play is therefore changed which may lead to jamming, distortions, and noise developments.

It is the object of the present invention to so further develop a differential gear of the aforementioned type that the aforementioned disadvantages do not occur, in which excessively large roller bearings are not needed, especially for the transmission of the locking forces, in which a safe disengagement is assured after the locking, in which the locking action occurs only with an intentional pressure admission and finally in which the tooth play between spur bevel gear and drive pinion is not impaired during a locking operation.

The underlying problems are solved according to the present invention in that the acted-upon lamellae set is supported at the gear of transmission housing by way of an axial bearing.

The locking force is therefore supported according to this invention against the gear or transmission housing by way of an axial bearing. Such an axial bearing permits a considerably higher load capacity than the radial bearings mentioned in the prior art so that the bearing does not assume any unacceptable dimensions.

In an appropriate construction according to the present invention, a transmission member is provided between the lamellae set and the axial bearing. This transmission member is separate from the differential housing from a force point of view and can thus transmit the locking force to the transmission housing without influence on the differential housing. In a preferred embodiment, the transmission member includes a circular ring which is slipped over an external guidance of the differential housing. The circular ring abuts with one end face at the axial bearing arranged at the transmission housing. The opposite side thereof passes over into fork-shaped arms which engage into the differential housing and cooperate with the lamellae set.

In another preferred embodiment, the axial bearing is located between a wheel output shaft and the gear or transmission housing. A thrust ring is provided for this purpose between the lamellae set and the wheel output shaft which introduces the locking force into the wheel output shaft. The thrust ring may thereby be provided ahead of the axle shaft gear so that the force path leads by way of the axle shaft gear. However, it should be noted with this solution that the distance between the thrust ring and the bearing seat of the axial bearing must be maintained very accurately in order to obtain the correct tooth play between axle shaft gear and differential bevel gears.

In a further advantageous embodiment of the present invention, the thrust ring is located to the rear of the axle shaft gear. A lamellae carrier is preferably provided in this case which acts on the thrust ring. The axle shaft gear remains free of loads in this construction during a locking operation. The advantage of this solution lies in the greater tolerance range between thrust ring and bearing seat of the axial bearing.

A further appropriate embodiment of the present invention is characterized in that the axial bearing is located between the differential housing and the transmission housing. In this construction, the lamellae set acts on an abutment shoulder of the differential housing which further transmits the loads onto the axial bearing.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 4 is a partial cross-sectional view through still another embodiment of a lockable differential gear in accordance with the present invention in which the forces proceed inside of the differential housing during a locking operation.

DETAILED DESCRIPTION OF THE DRAWINGS

Figure 1:
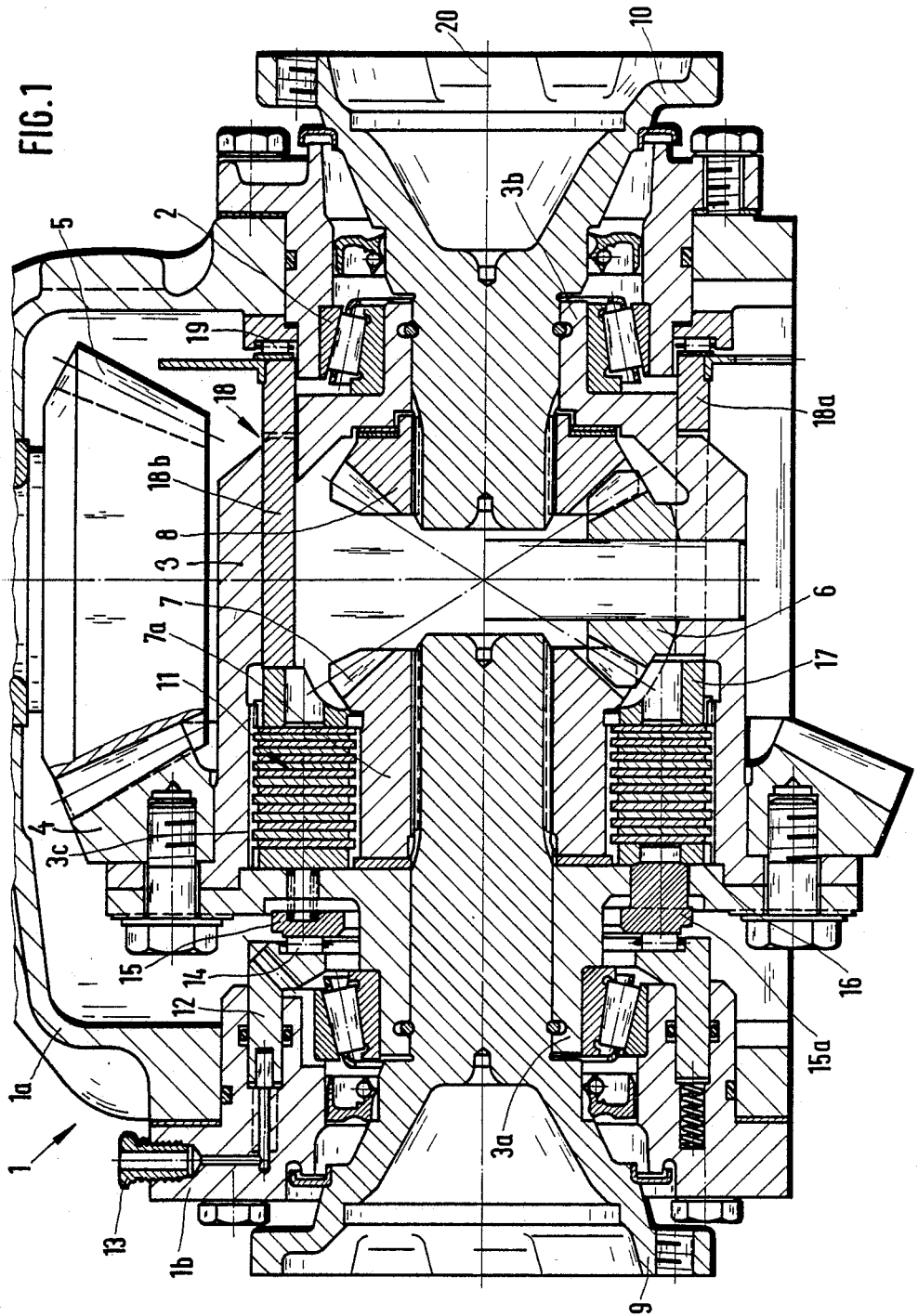
FIG. 1 is a partial cross-sectional view through a lockable differential gear with a transmission member engaging into the differential housing in accordance with the present invention.

Referring now to the drawing wherein like reference numerals are used throughout the various views to designate like parts, details of the various views which form no part of the present invention and which are readily understandable to a person skilled in the art, will not be described herein in detail.

FIG. 1 illustrates a lockable differential gear for motor vehicles with a gear or transmission housing 1 only illustrated in part, consisting of several partial sections not described in detail herein. A differential housing 3 is rotatably supported in the transmission housing 1 by way of radial roller bearings 2. An axis 20 generally designates thereby the main axis of the gear. Insofar as reference is made in the text herein without further identification to an axis, it is understood that it will always refer to the axis 20. The differential housing 3 itself consists again of a differential cage and of a spur bevel gear 4 secured thereon which meshes with a drive pinion 5 schematically indicated. Differential bevel gears 6 are provided in a known manner inside of the cage of the differential housing 3 whereby FIG. 1 only shows the lower differential bevel gear 6 as representative for the others. These differential bevel gears 6 mesh with the axle shaft gears 7 and 8. The axle shaft gears 7 and 8 are again non-rotatably seated on the wheel output shafts 9 and 10 by way of spline-tooth connections; the output shafts 9 and 10 establish by way of further shaft sections (not shown) the force connection to the driven wheels. The wheel output shafts 9 and 10 are guided inside of guide necks 3a and 3b of the differential housing 3.

The axle shaft gear 7 includes a forward toothed section meshing with the differential bevel gear 6; an offset, cylindrical shaft section 7a provided with axial grooves adjoins the forward toothed section. The differential housing 3 is provided in its interior also with an axial grooved sections 3c coaxial the shaft section and disposed opposite thereto. A lamellae set is arranged between these two sections 7a and 3c which is generally designated by reference numeral 11. It is built up of individual lamellae which are in driving connection alternately with the section 3c of the differential housing 3 or the section 7a of the axle shaft gear 7. For this purpose, one type of the lamellae is provided at its outer circumferences with corresponding engaging slots whereas the other type of lamellae includes comparable slots at its inner circumference. The lamellae of the lamellae set 11 may normally rotate relative to one another without or only with negligible resistance. However, if they are pressed against one another, they connect friction-lockingly the differential cage 3 with the axle shaft gear 7 and thus act as differential locking mechanism.

The pressing-together of the lamellae is effected by an annular piston 12 which is guided in the housing 1 and is adapted to be acted upon with pressure by way of a connecting nipple 13 and feed channels. The pressure medium is hydraulic oil in this case. The pressure connection between the annular piston 12 and the lamellae set 11 takes place by way of an axial thrust bearing 14 and a pressure or thrust plate 15 which includes pin-like projections 15a distributed along its circumference. The pressure plate 15 engages by means of these pin-like projections 15a through the differential housing 3 and acts upon the lamellae set 11 by way of a further spacer plate 16. A thrust ring 17 is also provided in the differential housing 3 at the oppositely disposed end of the lamellae set 11.

A transmission member generally designated by reference numeral 18 consists of a circular ring 18a with fork-like axial arms 18b formed-on at the circular ring 18a. The transmission member 18 is displaceably arranged by means of its circular ring 18a on an outer guidance of the differential housing 3. The outer guidance is thereby located on the side of the differential housing 3 opposite the lamellae set 11, i.e. at the height of the axial shaft gear 8 respectively of the wheel output shaft 10. The transmission member 18 engages with its axial arms 18b through corresponding openings into the differential housing 3 and abuts with the arm ends at the thrust ring 17. The other end of the transmission member 18 is supported at the transmission housing 1 by way of an axial bearing 19.

As already mentioned, the differential locking mechanism is not effective during normal operation. The differential gear maintains its differential function, i.e. it permits different numbers of rotation for the wheel output shafts 9 and 10. However, if the differential gear is to be locked, for example, because one wheel slips on a smooth surface, then pressure is supplied to the annular piston 12 by way of the connecting nipple 13. The annular piston 12 moves in the axial direction toward the right. The lamellae set 11 is pressed against the pressure or thrust ring 17 by way of the thrust bearing 14 as well as the thrust ring 15 and spacer plate 16. The pressure plate 17, in turn, is supported at the transmission housing 1 by way of the transmission member 18 and the axial bearing 19. The lamellae of the lamellae set 11 are pressed against one another in such a manner that a frictional connection will establish itself between the same and as a result thereof, the differential action is cancelled. The locking action can thereby be increased continuously depending on the pressure.

In FIG. 1 a lamellae set 11 is coordinated to only one axle shaft gear, namely the axle shaft gear 7. However, it is quite feasible without difficulty, to provide the same arrangement additionally on the opposite side. Two pressure connections for two separate hydraulic pressure lines would then merely be necessary. This is true analogously also for the other embodiments to be described hereinafter.

Figure 2:
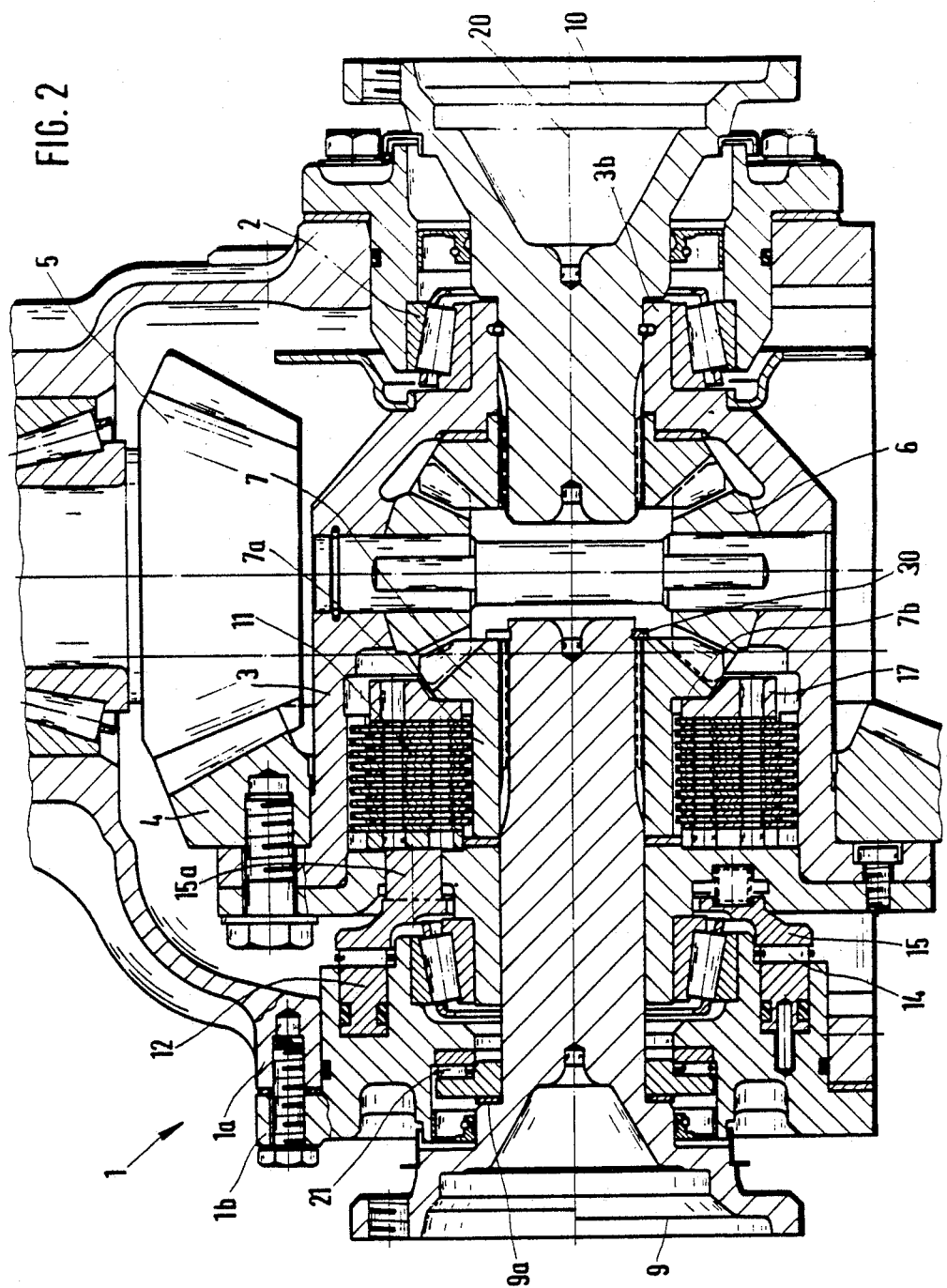
FIG. 2 is a partial cross-sectional view through a modified embodiment of a lockable differential gear in accordance with the present invention in which a thrust ring is seated on the wheel output shaft ahead of the axle shaft gear.

The embodiment according to FIG. 2 does not include a component comparable to the transmission member 18 according to FIG. 1. In lieu, the thrust ring 17 is supported in this embodiment at an annular shoulder 7b of the axle shaft gear 7. The annular shoulder 7b is formed by the offset section 7a accommodating the lamellae and the toothed part, properly speaking, of the axle shaft gear 7, which is larger in diameter. The axle shaft gear 7 again abuts with its forward section at a thrust ring 30, which is inserted into an annular groove on the wheel output shaft 9. The wheel output shaft 9 itself includes at its end projecting out of the differential housing 3 a bearing seat 9a for the accommodation of an axial bearing 21. The other bearing shell or cage of the axial bearing 21 is located in a correspondingly formed section of the transmission housing 1. If the lamellae set is acted upon with a locking force by way of the annular piston 12, it is supported at the transmission housing 1 by way of the thrust ring 17, the axle shaft gear 7, the thrust ring 20, the wheel output shaft 9, and the axial bearing 21. The forces are therefore conducted back to the transmission housing 1 by way of the wheel output shaft 9.

Figure 3:
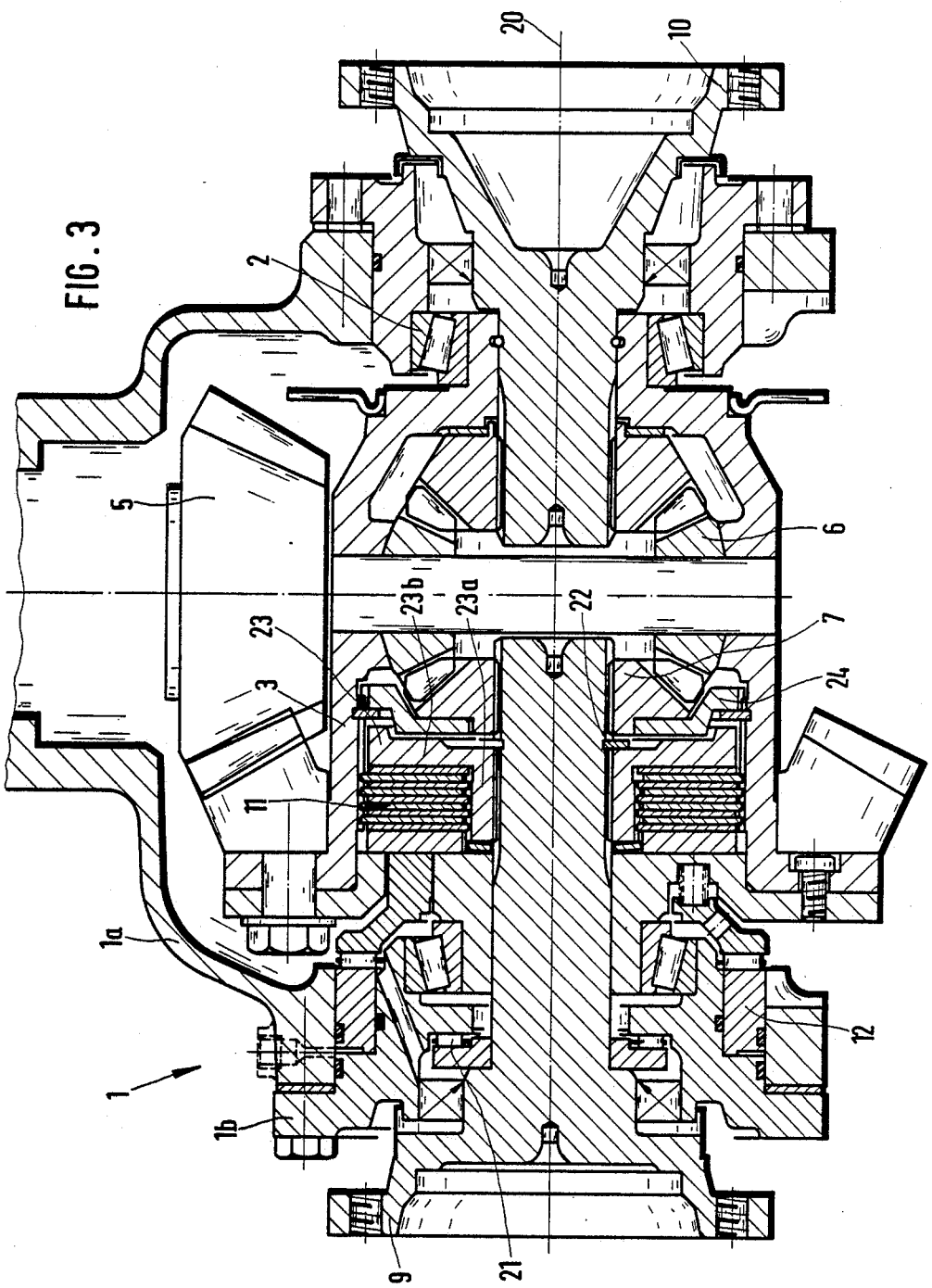
FIG. 3 is a partial cross-sectional view through a still further embodiment of a lockable transmission in accordance with the present invention, similar to FIG. 2, but with a thrust ring between the axle shaft gear and the lamellae set.

The embodiment according to FIG. 3 differs from that according to FIG. 2 in that, on the one hand, the thrust ring which is designated in this embodiment by reference numeral 22, is arranged behind the axle shaft gear 7. Additionally, the lamellae coordinated to the wheel output shaft 9 are not seated directly on the shaft, but on a lamellae carrier 23 interconnected there between. The lamellae carrier 23a consists of a cylindrical tubular section 23 reduced in diameter which is adjoined in one piece by a radially outwardly extending side wall 23b. The side wall 23b thereby faces the axle shaft gear 7, however, without contacting the same. The tubular section 23a of the lamellae carrier 23 is drivingly connected with the wheel output shaft by way of a spline-tooth connection and includes a further spline-tooth connection at its outer circumference for the engagement of the lamellae coordinated thereto. Additionally, the lamellae carrier is supported with its end face facing the axle shaft gear 7 at the thrust ring 22. The axle shaft gear 7 itself is, as already mentioned, not acted upon by the lamellae carrier 23, instead it abuts at a support wall 24 which is connected with the differential housing 3. During the actuation of the annular piston the forces proceed similar as in FIG. 2 by way of the shank of the wheel output shaft 9 to the axial bearing 21. However, the axle shaft gear 7 is outside of the force-path owing to the thrust ring 22 which is displaced toward the inside.

In FIG. 4 the comparable axle shaft bearing, designated therein by reference numeral 25, is provided between the guide neck 3a of the differential housing 3 and the transmission housing 1. A thrust ring 17 is again connected behind the lamellae set 11; the thrust ring is supported in this embodiment at an abutment shoulder 3d of the differential housing 3. The abutment force supplied by the annular piston 12 is introduced by way of the thrust ring 17 into the differential housing 3 and proceeds from there back by way of the axial bearing 25 to the transmission housing 1.

In FIGS. 3 and 4, the guidance of the annular piston 12 is constructed in a different manner from that in FIGS. 1 and 2. In the first two figures, a corresponding ring-shaped recess is provided in each case in a housing lid 1b of the transmission housing 1, within which the annular piston 12 is guided.

In FIGS. 3 and 4, the guidance is formed by the assembly of the transmission housing from a housing section 1a and a housing cover 1b. In this manner, the guidance can be machined in a simple manner into the housing cover 1b. For this purpose, the housing cover 1b has a section reduced in diameter which forms an outer cylinder surface.

The counter-part, namely, the radially outwardly disposed guide surface is machined as inner cylindrical surface into the housing section 1a. These two cylindrical surfaces are located opposite one another when the housing cover 1b is emplaced and form the guide cylinder for the annular piston 12 which results as annular space.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A lockable differential gear for motor vehicles, comprising transmission housing means, differential housing means rotatably supported in the transmission housing means; a lamellae set arranged in the differential housing means which is operable to be acted upon from the outside with a locking force; the activated lamellae set being supported at the transmission housing means by way of axial bearing means; a transmission member engaging into the differential housing means is arranged between the lamellae set and a portion of said axial bearing means; and wherein the transmission member includes a circular ring placed over an external guide means of the differential housing means, the circular ring abutting with its one end face at a portion of said axial bearing means and the other end face thereof passing over into forked-shaped axial arms engaging into the differential housing means and cooperating with the lamellae set.

2. A differential gear according to claim 1, wherein a guide cylinder means of an annular piston actuating the lamellae set is formed by the outer cylindrical surface of a section of a housing cover of the transmission housing which is reduced in diameter, and an inner cylinder surface of a housing section of the transmission housing means which is disposed opposite the outer cylindrical surface when the transmission housing means is assembled.

3. A lockable differential gear for motor vehicles, comprising transmission housing means, differential housing means rotatably supported in the transmission housing means; a lamellae set arranged in the differential housing means which is operable to be acted upon from the outside with a locking force; the activated lamellae set being supported at the transmission housing means by way of an axial bearing means; and wherein the lamellae set is drivingly connected to a wheel output shaft and cooperates with its side opposite the actuating force with a thrust ring fastened on the wheel output shaft, and the axial bearing means being provided between the wheel output shaft and the transmission housing means.

4. A differential gear according to claim 3, wherein the thrust ring is arranged between an axle shaft gear and the lamellae set.

5. A differential gear according to claim 4, further comprising lamellae carrier means provided rotatably and axially displaceably on the wheel output shaft and to the rear of the axial shaft gear, and wherein the thrust ring is arranged on the wheel output shaft in front of an end face of the lamellae carrier means a opposite the actuating force.

6. A differential gear according to claim 5, wherein a guide cylinder means of an annular piston actuating the lamellae set is formed by the outer cylindrical surface of a section of a housing cover of the transmission housing which is reduced in diameter, and an inner cylinder surface of a housing section of the transmission housing means which is disposed opposite the outer cylindrical surface when the transmission housing means is assembled.

7. A lockable differential gear for motor vehicles, comprising transmission housing means, differential housing means rotatably supported in the transmission housing means; a lamellae set arranged in the differential housing means which is operable to be acted upon from the outside with a locking force; the activated lamellae set being supported at the transmission housing means by way of an axial bearing means; wherein the lamellae set is supported with its side opposite the actuating force at an abutment shoulder of the differential housing means and the axial bearing means is provided between the differential housing means and the transmission housing means.

8. A differential gear according to claim 7, wherein the lamellae set is coordinated to a wheel output shaft and the wheel output shaft extends through a guide neck of the differential housing means, and wherein the axial bearing means is disposed between the free end of the guide neck and an offset abutment surface of the transmission housing means.

9. A differential gear according to claim 8, wherein the lamellae set is supported with its side opposite the actuating force at an abutment shoulder of the differential housing means and the axial bearing means is provided between the differential housing means and the transmission housing means.

* * * * *